Figure 1:
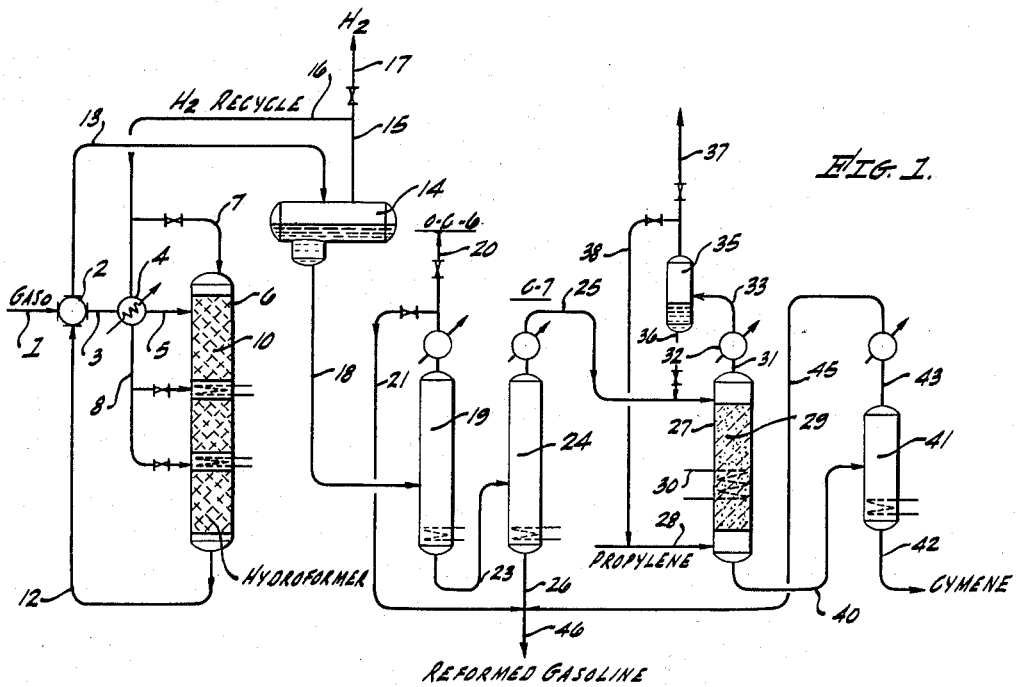

Jan. 8, 1957  D. A. SKINNER ET AL  2,777,007
ALKYLATION OF TOLUENE
Filed April 16, 1954

INVENTORS.
DAVIS A. SKINNER,
WILLIAM L. WASLEY,
BY
Lannas S. Henderson
AGENT.

United States Patent Office 2,777,007
Patented Jan. 8, 1957

2,777,007

ALKYLATION OF TOLUENE

Davis A. Skinner, Fullerton, and William L. Wasley, Santa Ana, Calif., assignors to Union Oil Company of California, Los Angeles, Calif., a corporation of California Application April 16, 1954, Serial No. 423,620

9 Claims. (Cl. 260—671)

This invention relates to methods for propylating toluene in such manner as to form maximum proportions of para-cymene, in preference to ortho- and meta-cymenes. It also embraces procedures for minimizing or avoiding the production of polypropylated toluenes, and for avoiding the formation of undesired polymers. Briefly, the process consists in contacting toluene with gaseous propylene at atmospheric pressure and low temperatures in the presence of a phosphorus pentoxide catalyst, and continuing the alkylation under these conditions until the product contains certain optimum mole-ratios of cymenes to poly-propylated toluenes. It has been found that the relative rates of alkylation of toluene and of cymenes are such that a considerable part of the toluene can be mono-propylated to form cymenes before any significant portion of the cymenes is further propylated. To achieve this result, it has been found in general that the propylation should be continued until not more than about 20% of the original toluene has been converted. The resulting product is then fractionated to recover unreacted toluene, and the higher-boiling cymene fraction. The cymene fraction so prepared is found to contain higher proportions of p-cymene, e. g. 45–55 mole-percent, than can be obtained by other propylation methods, and is essentially free from higher alkylated products and polymers.

The principal object of the invention is to provide specific methods of propylating which give the maximum proportion of p-cymene. Another object is to avoid the formation of di- and tri-propylated toluenes, and propylene polymers. A broader object is to provide a more plentiful and economical source of p-dialkyl benzenes than has heretofore been realized, with the ultimate goal in view of providing cheap raw material for the production of terephthalic acid by oxidation. Further objectives include the provision of economical techniques for obtaining continuous operation, and for the utilization of impure toluene cuts obtained from various petroleum fractions, e. g. reformed gasolines. Other objects will be apparent to those skilled in the art from the description which follows:

The aromatic dicarboxylic acids are highly important industrial raw materials by virtue of their use in the manufacture of polymeric esters for resins and synthetic fibers, monomeric esters for plasticizers, solvents and similar materials. Of these acids, terephthalic acid is at present the most valuable, mainly because of its use in the manufacture of polymeric ester for synthetic fibers such as dacron. In the past, terephthalic acid has generally been manufactured by the controlled oxidation of pure para-xylene. This process is economically undesirable in that it requires as the starting material substantially pure para-xylene, which is difficult to separate from meta-xylene. It has also been proposed to oxidize a mixture of isomeric xylenes to produce a mixture of the corresponding dibasic acids, i. e. ortho-phthalic, isophthalic and terephthalic acids. However, the separation of this acid mixture is also difficult and expensive.

The present invention takes an entirely new approach to the production of terephthalic acid. The toluene employed as starting material may be easily isolated by fractional distillation from the aromatic hydrocarbons obtained, for example by solvent extraction or azeatropic distillation of certain gasolines. The preferred gasolines are those obtained by the catalytic reforming or hydroforming or cracked and/or straight-run gasolines, preferably naphthenic gasolines. Such reformed gasolines ordinarily contain from about 40–60 volume-percent of aromatic hydrocarbons which may be easily separated from the non-aromatics by extraction with e. g. diethylene glycol, thiodipropionitrile, oxydipropionitrile, iminodipropionitrile, sulfur dioxide, or any of the well-known selective solvents for aromatics. The toluene contained in the aromatic extract boils at 110° C. while the nearest homologs, benzene and xylenes, boil at 80° and about 138° C., respectively. The isolation of toluene is therefore readily achieved, and since the proportion by volume of toluene in the aromatic extract is ordinarily about 6–10 times that of the p-xylene, it will be readily apparent that toluene is potentially a much more plentiful and economical raw material than p-xylene.

Instead of first separating the total aromatic content of the gasoline, and then fractionating to obtain toluene, a narrow-boiling toluene-containing cut, boiling at e. g. 110°–115° C. may first be isolated and then treated to separate the toluene from the non-aromatics. The latter separation may be achieved by solvent extraction, or by azeotropic distillation with e. g. methylethyl ketone, nitromethane, or any other material which is capable of azeotroping the paraffins overhead.

Alternatively, instead of isolating pure toluene, the gasoline may simply be fractionally distilled to obtain a cut boiling e. g. from 105°–115° C., and containing about 30–70% by volume of toluene, the remainder being largely paraffins. This entire cut may be subjected to alkylation, in which case the paraffins function as an inert diluent. The resulting alkylate may then be fractionated to obtain a high-boiling cymene cut, while the total overhead, consisting mainly of the original paraffins plus unreacted toluene, may be utilized as gasoline blending stock. This particular modification is highly advantageous inasmuch as it permits the alkylation on an economical basis of only a very minor portion of the toluene on a once-through, non-recycle basis. If pure toluene is employed, the recycle distillation expenses are not counterbalanced by the cheapness of the raw material, as is the case with impure gasoline fractions.

It is well known in alkylation reactions that the nature of the alkylating agent is a critical factor, in addition to the effects of the catalyst. In the alkylation of aromatic compounds, there are apparently at least two principal factors which determine the orientation on the ring of the entering alkyl groups. One factor is the inherent electro-chemical influence of the substituents already on the ring. For example, an alkyl group is known inherently to favor the further substitution of the ring in the ortho and para positions. Other substituents such as nitro groups are known to favor the formation of meta isomers. However, the electro-chemical orienting effect of the groups already on the ring is not the sole determinant as to the course of further alkylation. Another major factor is the steric configuration and size of the entering group, and the steric effects on the groups already present. For example if a benzene ring is already substituted by one tertiary butyl group, the ortho positions are sterically blocked so that further substitution takes place almost exclusively on the para position. This effect is not obtained however with toluene.

The situation is further complicated by the fact that the higher alkyl groups, for example propyl, butyl and isobutyl are inherently easier to introduce onto the ring than are the lowest members of the alkyl series, ethyl and methyl. It is in fact very difficult to introduce methyl groups into the ring under conditions which do not also effect isomerization. The same applies to a lesser extent to ethyl groups. In view of all these factors, it is usually very difficult to predict the exact results which will be obtained under a given set of alkylation conditions. In the present case it has been found that propylene gives the best results in obtaining the desired isomer distribution.

The alkylation of toluene has been studied in the past, but insofar as we are aware no one has succeeded in monoalkylating toluene to obtain exclusively, or even predominantly, the para-isomer. In most cases a mixture of isomers is produced wherein the concentration of para-isomer is at most about 35 mole-percent. A procedure has been described in the literature (Malishev, J. A. C. S. 57, p. 884) for the propylation of toluene in the presence of $P_2O_5$ catalysts. However, high temperatures were employed, and the propylation was exhaustive, both factors resulting in the formation of large amounts of propylene polymer and polyalkylated toluenes. The cymenes produced were identified as para-cymene, but the identification was evidently based only on density measurements; our work has shown that the process will not produce pure p-cymene.

The present invention differs from the methods heretofore suggested in that the propylating conditions are essentially non-isomerizing and non-polymerizing, while at the same time the extent of propylation is controlled so as to avoid loss of toluene and propylene in the form of polyalkylateed toluenes. Obtaining all three of these objectives simultaneously while also favoring the formation of the para isomer, requires the observance of critical process conditions as to catalyst, temperature, pressure and extent of reaction.

The operative catalysts comprise mainly phosphorus pentoxide, or combinations thereof with modifiers, e. g. mildly acidic alkylation catalysts which do not form definite complexes with the hydrocarbons, and do not cause isomerization or transalkylation under mild conditions. The phosphorus pentoxide should be substantially anhydrous since phosphoric acid is not as active for the alkylation, and does not give the desired high ratios of para isomer. The catalysts may be employed alone, or supported on a carrier such as activated carbon, silicon gel, activated clays and the like. Suitable acid modifiers include for example p-toluene sulfonic acid, arsenic trioxide, o-phthalic acid, etc. Particularly valuable combinations consist of phosphorus pentoxide and p-toluene sulfonic acid, or phosphorus pentoxide and arsenic trioxide. However, phosphorus pentoxide, either alone or on a carrier, is almost equally effective in producing a large initial proportion of para isomer. In any case the phosphorus pentoxide should be finely divided so as to present a maximum of surface area.

The temperatures to be observed in carrying out the propylation may range between about 20° and 110° C., and preferably between about 75° and 100° C. At those temperatures, it will be found that from about 5% to 20% of the toluene may be alkylated at a contact time ranging between about 5 minutes and 4 hours. Temperatures higher than about 110° C. should be avoided, both from the standpoint of simple economy inherent in operating at atmospheric pressure, and also because higher temperatures result in substantial polymerization of propylene, and/or isomerization of the alkylated products. It is desired to prevent isomerization in order to preserve the high ratio of para-cymene which is initially produced, and also to prevent trans-alkylation with resultant formation of high-boiling products. The formation of propylene polymers is disadvantageous, not only from the standpoint of propylene waste, but because some of the propylene polymers boil in the same range as toluene and cymene, and hence complicate the purification problems. Superatmospheric pressures also favor polymerization and hence are avoided. The process is preferably conducted at atmospheric pressure, although pressures between about 0 and 20 p. s. i. a. may be employed.

The contact time during which the toluene remains in contact with the catalyst, should be so adjusted and correlated with the reaction temperature that not more than about 20 mole percent of the toluene is alkylated before the resulting cymenes are separated therefrom. If the alkylation is continued beyond this point the formation of poly-propylated toluenes increases at a greatly accelerated rate, while the rate of formation of cymenes falls off rapidly. The term "contact time" as employed herein is intended to mean the length of time which each increment of toluene is contacted with the catalyst while in the presence of unreacted propylene. Hence, the effective contact time may be controlled by varying either the flow rate of toluene through the catalyst contacting zone, or the rate of passage of propylene therethrough. Either one or both of these factors should be controlled by a means responsive to the cymene content of the product from the reaction zone.

After the necessary contact period, the product is removed from the reaction zone and subjected to fractional distillation to recover unreacted toluene overhead and cymene as bottoms. If pure toluene is employed as feed, the overhead will be substantially pure toluene which may be recycled to the catalyst contacting zone. If an impure source of toluene is employed, such as a C–7 gasoline fraction, it may be subjected to continuous alkylation until the toluene content is reduced to an uneconomical level, or it may be alkylated on a once-through basis, and the total non-alkylated overhead may be used as blending stock for gasolines.

From a theoretical standpoint it might appear that the undesired formation of poly-alkylated toluenes could be prevented by simply recycling an equilibrium proportion of such poly-alkylated products. However, the present alkylation conditions do not permit such an operation since the conditions of reaction are non-reversible and non-isomerizing. The recycled poly-alkylated toluenes would therefore continue to build up in the reaction system. It is therefore necessary to remove continuously the precursor of such poly-alkylated toluene if it is desired to prevent their formation under the present alkylating conditions, which are designed to favor the formation of para-cymene.

The process may be carried out in either continuous or batch-wise fashion. In batch operation, the phosphorus pentoxide catalyst is preferably admixed with finely divided activated carbon or other adsorbent material in order to prevent the agglomeration of phosphorus pentoxide which normally occurs in the absence of a solid carrier. In some cases a small amount of a peptizing agent, e. g. p-cresol, may be desirable.

However, the process is more readily adaptable to continuous operation, in which case it is preferable to support the catalyst on a stationary granular carrier, so that the phosphorus pentoxide will not be carried out of the reactor with the product. Suitable ratios of phosphorus pentoxide to carrier may range between about 1/1 and 1/50 by weight. The carrier may be suitably ground or pelleted to meet the desired flow conditions in the reactor. Granular carriers ranging between about 5 and 50 mesh may suitably be employed. Supported catalysts may be prepared by simply shaking the granular carrier with powdered $P_2O_5$. Alternatively, the carrier may be impregnated with a solution of yellow phosphorus in e. g. carbon disulfide, and then carefully oxidized to convert the phosphorus to $P_2O_5$.

The invention may be carried out batch-wise by bubbling propylene through the liquid toluene in the presence of the powdered or granular catalyst. It may be desirable to agitate the mixture to provide adequate contact, and slight heating may be desirable although the reaction is in itself exothermic. In case a continuous process is desired, the toluene may be circulated in liquid phase downwardly through a bed of the catalyst while propylene is bubbled countercurrently therethrough. Alternatively, continuous concurrent flow may be employed.

Reference is now made to the accompanying Figure 1 which shows schematically a process for utilizing the total C-7 fraction from reformed gasoline. In this process, straight-run and/or cracked gasoline is brought in through line 1, passed through heat interchanger 2, line 3, heater 4, line 5 and into catalytic hydroformer 6. Recycle hydrogen is admitted to the hydroformer through line 7 and/or through auxiliary hydrogen injection line 8. The general conditions for catalytic hydroforming of gasolines are well known and hence need not be described in detail. In general, it may be stated that the hydroforming temperatures range between about 850–1100° F., pressures between 50 and 1000 p. s. i. g., feed rates between about 0.1 and 10 volumes of liquid feed per volume of catalyst per hour, with hydrogen recycle rates of about 1000–10,000 s. c. f. per barrel of feed. The hydroformer 6 is packed with any suitable hydroforming catalyst 10. Such catalysts include generally the transitional metals and their oxides or sulfides supported on adsorbent carriers such as alumina, alumina-silica, clays, etc. The preferred active metals are those selected from VIB and VIII of the periodic table, such as chromium, molybdenum, tungsten, platinum, or combinations of group VIB metals with group VIII metals, such for example as cobalt-molybdate.

The total product from the hydroformer is taken off through line 12, passed through interchanger 2 in heat-exchange relationship with the feed, and then through line 13 to a gas-liquid separator 14. Hydrogen-rich gas is taken off through line 15, part of which is recycled through line 16, while the net hydrogen make is taken off through line 17 for use elsewhere in the refinery.

The gasoline accumulating in separator 14 is a highly aromatic product having an improved knock rating over the original feed. Any desired portion of this product is then taken off through line 18 to supply the crude toluene for propylation. In the modification illustrated, this portion of gasoline is first fractionated in column 19 to take off overhead the materials boiling up to about 100° C. This overhead may be utilized in any desired manner. It may for example be drawn off through line 20 for the isolation of benzene or other valuable chemical products. Alternatively, it may be diverted through line 21 to be blended with gasoline stocks. The bottoms from column 19 is then transferred through line 23 to a second distillation column 24 wherein the desired C-7 fraction, boiling between about 105° and 115° C., is separated overhead and taken off in line 25. This overhead ordinarily will comprise between about 30% and 70% by volume of toluene, the remainder consisting largely of paraffins. The bottoms from column 24 consists of a heavy gasoline fraction which is taken off through line 26 to be utilized for gasoline blending stock in any desired manner.

The toluene fraction in line 25 is then admitted to the top of a continuous alkylation unit 27, wherein it flows counter-currently to gaseous propylene admitted through line 28. The flow rate of the liquid feed and/or the gaseous propylene is so adjusted that the effective contact time in reactor 27 is insufficient to permit alkylation of more than about 1–5 mole-percent of the cymene formed. This ordinarily entails alkylating about 5–20 mole-percent of the toluene supplied. It will be understood of course that the catalyst 29 in reactor 27 may consist of any of the phosphorus pentoxide compositions heretofore described. Ordinarily the desired temperature of propylation may be maintained by adjusting the temperature of incoming reactants. However if additional heating or cooling is necessary, this may be accomplished by means of a heat exchanger 30 located at any point in the reactor.

The propylene employed herein may be substantially pure, or it may be a dilute propylene stream derived from a de-propanizer column, containing for example 30–60 volume percent of propylene. Any off-gases from the reactor 29 are taken off through line 31, cooled in heat exchanger 32 to condense out entrained liquids, and then transferred through line 33 to a gas-liquid separator 35. The condensed liquid accumulating in separator 35 consists predominantly of toluene which may be drawn off through line 36 and recycled with incoming feed. The gas phase in separator 35 may consist predominantly of propylene, or it may be largely paraffinic, depending upon the purity of the feed gas. If it is too lean in propylene to be economically recycled it may be exhausted through line 37 and utilized for fuel gas or other purposes. If it is sufficiently rich in propylene it may be recycled through line 38 to the propylene feed line 28.

The liquid product from reactor 29 is transferred through line 40 to a distillation column 41 to separate the cymene fraction as bottoms through line 42, from the overhead in line 43. This overhead consists mainly of paraffins and unreacted toluene. In the modification illustrated this total overhead is condensed and recycled through line 45 to the heavy gasoline stream in line 26, thereby producing a full range gasoline in line 46. It will be found that this final gasoline blend will have only slightly reduced aromaticity as compared to the original hydroformer effluent, and the knock rating will be only slightly reduced.

Figure 2:
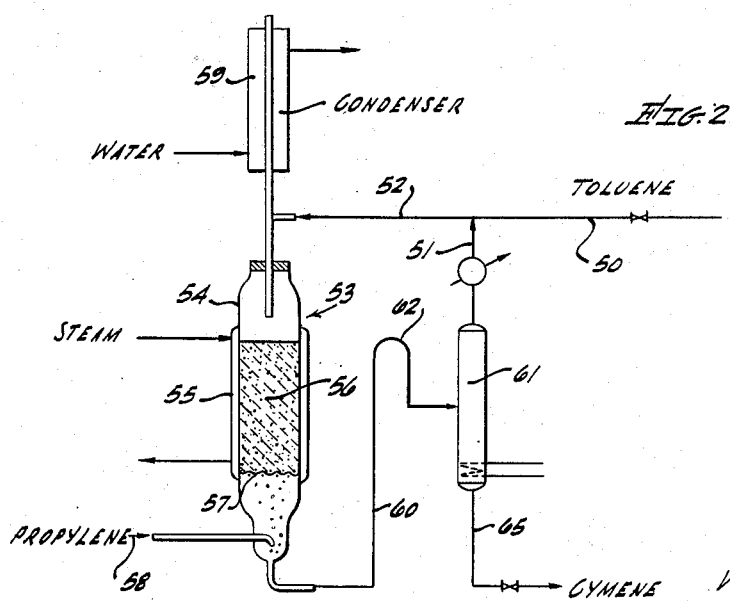

Referring now to Figure 2, this modification illustrates a suitable method for utilizing substantially pure toluene, wherein the non-alkylated toluene is continuously recycled to the alkylator. The fresh feed toluene is brought in through line 50, mingled with recycle toluene from line 51, and the total feed is then passed through line 52 into the top of a packed reactor 53. Reactor 53 is particularly designed for laboratory work, but can readily be adapted to commercial production. The reactor consists merely of a generally tubular glass member 54 surrounded by a steam jacket 55, and containing a catalyst charge 56 which is supported on a screen 57. Gaseous propylene is admitted through line 58 and allowed to bubble upwardly through the reactor, and any unreacted gases pass upwardly into a condenser 59, which refluxes unreacted toluene downwardly. The alkylated product is withdrawn continuously through line 60 and transferred to a distillation column 61. In the modification illustrated the transfer line 60 is arranged so that its highest elevation at 62 corresponds to the desired liquid level in the reactor 53, thereby automatically maintaining the desired liquid level in the reactor, and providing for automatic adjustment of flow rates by merely regulating the flow of feed through line 52. Product cymenes are continuously removed through line 65.

The invention may perhaps be more readily understood from the following examples, which however are illustrative only.

EXAMPLE I

In order to compare the orienting effects of various catalysts for mono-alkylation, a series of batch experiments were carried out in liquid phase at atmospheric pressure utilizing gaseous propylene as the alkylating agent. The results were as follows:

Table 1

| Run No. | Gms. Toluene | Catalyst | Temp., °C. | Time, Hrs. | Mole ratio $C_3H_6/C_7H_8$ | Percent Conversion Toluene | Percent Isomer dist. ortho | meta | para | Botts, gms. |
|---|---|---|---|---|---|---|---|---|---|---|
| 1 | 276 | 15 g. $P_2O_5$ / 7 g. act. C | 40 | 1.5 | 0.66 | 27.5 | 38.6 | 15.3 | 46.1 | 11.2 |
| 2 | 270 | 15 g. $P_2O_5$ / 7 g. act. C / 1 g. p-cresol | 80 | 2.0 | 0.83 | 64.0 | 30.9 | 14.3 | 54.8 | 64.0 |
| 3 | 276 | 25 ml. 48% / BF$_3$-etherate | 100 | 2.0 | 0.83 | 12.2 | 42.4 | 22.2 | 35.4 | 9.0 |
| 4 | 460 | 100 ml. 85% $H_3PO_4$ sat'd with BF$_3$ | 25 | 2.0 | 0.8 | 45.0 | 41.6 | 24.6 | 33.8 | 53 |
| 5 | 346 | 100 ml. conc. $H_2SO_4$ | 5 | 1.5 | 0.55 | 35.0 | 47.5 | 19.8 | 32.7 |   |
| 6 | 346 | 50 g. FeCl$_3$ | 70 | 1.0 | 0.5 | 18.2 | 45.1 | 21.3 | 33.6 |   |
| 7 | 276 | 13.1 g. AlCl$_3$ / 6.0 g. HCl | 0 | 1.5 | 1.3 | 53.0 | 34.0 | 25.0 | 41.0 | 168 |

In Table 1, the indicated mole-ratio of propylene represents the amount supplied, not necessarily the amount absorbed. It will be noted that in runs 1 and 2, using $P_2O_5$ as catalyst, the cymenes obtained were 46.1% to 54.8% para-cymene. In runs 3 to 6, employing typical Friedel-Crafts type catalysts, the cymenes were only 32.7% to 35.4% para-cymene. It will also be noted that in run No. 2, polyalkylation, as indicated by the large proportion of bottoms product, resulted in an increase in the ratio of p-cymene as compared to run No. 1. The large proportion of high-boiling product in run No. 7 indicates that substantial polyalkylation and/or polymerization occurred. This indicates that AlCl$_3$-HCl catalyst, even at 0° C., causes considerable isomerization and/or polymerization. Other experiments have demonstrated that phosphorus pentoxide will also cause isomerization and/or polymerization at temperatures above those employed herein.

EXAMPLE II

In order to determine the effects of varying the extent of alkylation, a series of propylations at various feed rates were carried out in a reactor similar to that shown in Figure 2, using as catalyst 25 grams of anhydrous $P_2O_5$ supported on 50 gms. of 12–28 mesh charcoal. The catalyst bed temperature was maintained at 80–88° C. throughout, and the propylene feed rate was 0.2 s. c. f. per hour. The results are as follows:

Table 2

| Run No. | Feed rate, ml. tol./Hr. | Residence time per pass, Hrs. | Toluene Conversion, percent per pass | Mole-ratio, polyalkyl-toluenes/cymenes | Percent para isomer in cymenes |
|---|---|---|---|---|---|
| 1 | 700 | 0.16 | 4.2 | 0 | 54 |
| 2 | 480 | 0.24 | 7.5 | 0 | 49 |
| 3 | 200 | 0.6 | 13.0 | 0.01 | 52 |
| 4 | 75 | 1.6 | 23.2 | 0.12 | 53 |
| 5 | 40 | 3.0 | 36.1 | 0.29 | 59 |
| 6 | 7.5 | 16.0 | 55 | 0.41 | 63 |

From the above data it will be apparent that there is an initial very rapid rate of alkylation of toluene, which falls off more rapidly than can be accounted for merely by the dilution effect of the cymenes formed. The cymenes appear to retard catalytically the alkylation of toluene, and are themselves slowly alkylated. Runs 1 to 4 represent commercially feasible alkylation rates and conversions as applied to pure toluene. When utilizing gasoline fractions as described above, even lower conversions per pass are feasible, preferred conversion levels for that operation ranging between about 5% and 15%. While these low conversion levels increase the product distillation loads, the capacity of the catalyst and the reactor in terms of pounds of cymene per hour per unit of reactor volume, are materially increased, thereby compensating for the increased distillation costs.

The cymenes produced herein ordinarily comprise about 45–55% of the para isomer, and about 45–55% meta and ortho isomers. This mixture is difficult to resolve by conventional procedures such as distillation or fractional crystallization. However, it may be readily resolved by a newly developed procedure involving selective clathration in certain solid Werner complexes such as nickel tetra (4-ethyl pyridine) dithiocyanate, as is more particularly described in the copending application of William D. Schaeffer, Serial No. 407,572, filed February 1, 1954. In this procedure, the para-cymene is selectively clathrated in preference to the ortho and meta isomers. Operative Werner complexes may comprise any of the group VIIB and group VIII metal salts coordinated with substituted pyridine bases.

While in the above examples and description, specific materials and conditions have been discussed, it is not intended that the invention should be limited to such. Many variations will be apparent to those skilled in the art, and it is intended to include such variations within the scope of the claims.

We claim:

1. A process for mono-propylating toluene selectively in the para position which comprises subjecting toluene to propylation with propylene at a temperature between about 20° and 110° C. in the presence of an alkylation catalyst comprising as the essential component phosphorous pentoxide, continuing said propylation until between about 5% and 20% of said toluene has been alkylated, then terminating said propylation and recovering from the reaction product unreacted toluene and a cymene fraction containing at least about 40 mole-percent of para-cymene.

2. A process as defined in claim 1 wherein said propylation is conducted at substantially atmospheric pressure.

3. A process for mono-propylating toluene selectively in the para position which comprises subjecting toluene to propylation with propylene at a temperature between about 75° and 100° C. in the presence of an alkylation catalyst comprising as the essential component phosphorous pentoxide, continuing said propylation until between about 5% and 20% of said toluene has been alkylated, then terminating said propylation and recovering from the reaction product unreacted toluene and a cymene fraction containing at least about 40 mole-percent of para-cymene.

4. A continuous process for the mono-propylation of toluene selectively in the para position which comprises passing liquid toluene downwardly through a catalyst contacting zone maintained at a temperature between about 20° and 110° C. and containing as the essential catalytic component phosphorous pentoxide, passing gaseous propylene countercurrently through said catalyst contacting zone, continuously removing liquid product from the lower portion of said contacting zone, and separating unreacted toluene and a cymene fraction from said liquid product, the flow-rate of feed toluene being controlled so as to provide a residence time in said contacting zone which is sufficient to permit alkylation of at least about 5% of the total feed toluene, but is insufficient to permit alkylation of more than about 20% thereof.

5. A process as defined in claim 6 wherein the toluene residence time in said contacting zone is between about 5 minutes and 4 hours.

6. A process for producing a mixture of cymenes wherein the proportion of para-isomer is at least about 40 mole percent, which comprises fractionating a catalytically reformed gasoline to obtain a toluene fraction boiling between about 105° and 115° C. and containing between about 30 and 70 volume percent of toluene, subjecting said toluene fraction to mono-alkylation with propylene at a temperature between about 20° and 110° C. in the presence of an alkylation catalyst comprising as the essential component phosphorous pentoxide, continuing said propylation until between about 5% and 20% of said toluene has been alkylated, then terminating said propylation, and subjecting the resulting product to distillation to obtain a high-boiling cymene fraction containing at least about 40 mole-percent para-cymene, and a low boiling toluene-paraffin fraction suitable for gasoline blending stock.

7. A process as defined in claim 6 wherein said alkylation is continued until not more than about 15 mole-percent of the toluene in said toluene fraction is converted, and then separating the liquid product from the catalyst and fractionating the same to obtain a para-cymene rich fraction.

8. A process as defined in claim 6 wherein said alkylation is carried out at substantially atmospheric pressure.

9. A continuous process for producing a mixture of cymenes wherein the proportion of para-isomer is at least about 40 mole-percent, which comprises fractionating a catalytically reformed gasoline to obtain a toluene fraction boiling between about 105° and 115° C. and containing between about 30 and 70 volume percent of toluene, passing said toluene fraction downwardly through a catalyst contacting zone maintained at a temperature between about 20° and 110° C. and containing as the essential component phosphorous pentoxide, passing gaseous propylene countercurrently through said catalyst contacting zone to effect mono-propylation of toluene, continuously removing liquid product from the lower portion of said contacting zone, and subjecting the resulting product to distillation to obtain a high-boiling cymene fraction, and a low boiling toluene-paraffin fraction suitable for gasoline blending stock, the flow-rate of feed toluene being controlled so as to provide a residence time in said contacting zone which is sufficient to permit alkylation of at least about 5% of the total feed toluene, but is insufficient to permit alkylation of more than about 20% thereof.

References Cited in the file of this patent
UNITED STATES PATENTS

| | | |
|---|---|---|
| 2,141,611 | Malishev | Dec. 27, 1938 |
| 2,143,472 | Boultbee | Jan. 10, 1939 |
| 2,324,784 | Lieber | July 20, 1943 |
| 2,431,515 | Shepardson | Nov. 25, 1947 |
| 2,564,488 | Mahan | Aug. 14, 1951 |

OTHER REFERENCES

Berry et al.: "Jour. Am. Chem. Soc.," vol. 49 (December 1927), pages 3142–9.

Condon: "Jour. Am. Chem. Soc.," vol. 70, No. 6 (June 1948), pages 2265–7.